(12) United States Patent
Carnevali et al.

(10) Patent No.: US 12,126,199 B2
(45) Date of Patent: Oct. 22, 2024

(54) CRADLES FOR A MOBILE DEVICE INCLUDING A CAVITY FOR A WIRELESS DEVICE AND METHODS OF MAKING AND USING

(71) Applicant: National Products, Inc., Seattle, WA (US)

(72) Inventors: Jeffrey D. Carnevali, Seattle, WA (US); Stefan Michael Gottschalk, Seattle, WA (US)

(73) Assignee: National Products, Inc., Seattle, WA (US)

( * ) Notice: Subject to any disclaimer, the term of this patent is extended or adjusted under 35 U.S.C. 154(b) by 660 days.

(21) Appl. No.: 17/397,258

(22) Filed: Aug. 9, 2021

(65) Prior Publication Data
US 2023/0045485 A1 Feb. 9, 2023

(51) Int. Cl.
*H02J 7/00* (2006.01)
*F16M 13/02* (2006.01)
*H04M 1/06* (2006.01)

(52) U.S. Cl.
CPC ......... *H02J 7/0044* (2013.01); *F16M 13/022* (2013.01); *H04M 1/06* (2013.01)

(58) Field of Classification Search
CPC ...... H02J 7/0044; H02J 50/00; F16M 13/022; F16M 2200/028; F16M 11/041; F16M 13/00; H04M 1/06; H04M 1/04
See application file for complete search history.

(56) References Cited

U.S. PATENT DOCUMENTS

| | | | |
|---|---|---|---|
| 809,977 | A | 1/1906 | O'Brien |
| 1,786,459 | A | 7/1926 | Simons |
| 2,495,552 | A | 1/1950 | Schmitz |
| 2,549,917 | A | 4/1951 | Millbrandt |

(Continued)

FOREIGN PATENT DOCUMENTS

| | | |
|---|---|---|
| CN | 101674096 | 3/2010 |
| CN | 202268924 | 6/2012 |

(Continued)

OTHER PUBLICATIONS

Battery Charging Specification (Including errata and ECNs through Mar. 15, 2012); Revision 1.2, Mar. 15, 2012. 72 pages.

(Continued)

*Primary Examiner* — Stacy Whitmore
(74) *Attorney, Agent, or Firm* — Branch Partners PLLC; Bruce E. Black

(57) ABSTRACT

A cradle for a mobile device includes a cradle base including a removable cover, a cavity base, and sidewalls extending from the cavity base to the removable cover, where the removable cover is configured for resting a back surface of a mobile device received in the cradle, where the removable cover, the cavity base, and the sidewalls define a cavity configured for receiving a wireless device configured for wirelessly interacting with the mobile device received in the cradle. The cradle also includes a top device receiver coupled to the cradle base and configured to receive and retain a top portion of the mobile device received in the cradle and a bottom device receiver coupled to the cradle base and configured to receive and retain a bottom portion of the mobile device received in the cradle.

20 Claims, 5 Drawing Sheets

(56) References Cited

U.S. PATENT DOCUMENTS

| | | |
|---|---|---|
| 2,565,939 A | 8/1951 | Wriston |
| 2,612,947 A | 10/1952 | Jenks |
| 2,717,093 A | 9/1955 | Mautner |
| 2,803,368 A | 8/1957 | Koch |
| 3,018,525 A | 1/1962 | Deisenroth |
| 3,140,883 A | 7/1964 | Anthony |
| 3,464,579 A | 9/1969 | Asenbauer |
| 3,667,648 A | 6/1972 | Koziol |
| 3,885,701 A | 5/1975 | Becklin |
| 3,972,459 A | 8/1976 | Cooper |
| 3,978,830 A | 9/1976 | Toth, Jr. |
| 4,298,204 A | 11/1981 | Jinkins |
| 4,564,880 A | 1/1986 | Christ et al. |
| 4,607,772 A | 7/1986 | Hancock |
| 4,828,558 A | 5/1989 | Kelman |
| 4,842,174 A | 6/1989 | Sheppard et al. |
| 4,848,319 A | 7/1989 | Appeldorn |
| 5,002,184 A | 3/1991 | Lloyd |
| 5,096,317 A | 3/1992 | Phillippe |
| 5,135,189 A | 8/1992 | Ghazizadeh |
| 5,246,133 A | 9/1993 | James |
| 5,272,771 A | 12/1993 | Ansell et al. |
| 5,295,602 A | 3/1994 | Swanson |
| 5,353,934 A | 10/1994 | Yamauchi |
| 5,457,745 A | 10/1995 | Wang |
| 5,535,274 A | 7/1996 | Braitberg et al. |
| 5,584,054 A | 12/1996 | Tyneski et al. |
| 5,586,002 A | 12/1996 | Notarianni |
| 5,641,065 A | 6/1997 | Owens et al. |
| 5,646,649 A | 7/1997 | Iwata et al. |
| 5,791,506 A | 8/1998 | Sheffler et al. |
| 5,813,096 A | 9/1998 | Soennichsen |
| 5,822,427 A | 10/1998 | Braitberg et al. |
| 5,842,670 A | 12/1998 | Nigoghosian |
| 5,845,885 A | 12/1998 | Carnevali |
| 5,860,550 A | 1/1999 | Miller et al. |
| 5,888,087 A | 3/1999 | Hanson et al. |
| 5,895,018 A | 4/1999 | Rielo |
| 5,953,795 A | 9/1999 | Bauer |
| 5,969,057 A | 10/1999 | Schoeley et al. |
| 5,990,874 A | 11/1999 | Tsumura et al. |
| 5,992,807 A | 11/1999 | Tarulli |
| 6,009,601 A | 1/2000 | Kaufman |
| 6,010,005 A | 1/2000 | Reames et al. |
| 6,032,910 A | 3/2000 | Richter |
| 6,034,505 A | 3/2000 | Arthur et al. |
| 6,035,800 A | 3/2000 | Clifford |
| 6,043,626 A | 3/2000 | Snyder et al. |
| 6,068,119 A | 5/2000 | Derr et al. |
| 6,149,116 A | 11/2000 | Won |
| 6,191,943 B1 | 2/2001 | Tracy |
| 6,229,893 B1 | 5/2001 | Chen |
| 6,273,773 B1 | 8/2001 | Bourke |
| 6,276,552 B1 | 8/2001 | Vervisch |
| 6,295,198 B1 | 9/2001 | Loh et al. |
| 6,341,218 B1 | 1/2002 | Poplawsky et al. |
| 6,356,053 B1 | 3/2002 | Sandoz et al. |
| 6,377,825 B1 | 4/2002 | Kennedy et al. |
| 6,392,882 B1 | 5/2002 | Chen et al. |
| 6,406,758 B1 | 6/2002 | Bottari et al. |
| 6,407,860 B1 | 6/2002 | Funazaki et al. |
| 6,438,229 B1 | 8/2002 | Overy et al. |
| 6,561,476 B2 | 5/2003 | Carnevali |
| 6,572,176 B2 | 6/2003 | Davies et al. |
| 6,585,212 B2 | 7/2003 | Carnevali |
| 6,588,637 B2 | 7/2003 | Gates et al. |
| 6,597,924 B1 | 7/2003 | Smith |
| 6,614,423 B1 | 9/2003 | Wong et al. |
| 6,646,864 B2 | 11/2003 | Richardson |
| 6,648,376 B2 | 11/2003 | Christianson |
| 6,687,516 B2 | 2/2004 | Chen |
| 6,702,604 B1 | 3/2004 | Moscovitch |
| 6,754,343 B2 | 6/2004 | Lundstrom et al. |
| 6,762,585 B2 | 7/2004 | Liao |
| 6,776,422 B1 | 8/2004 | Toy |
| 6,785,566 B1 | 8/2004 | Irizarry |
| 6,785,567 B2 | 8/2004 | Kato |
| 6,816,713 B2 | 11/2004 | Chen |
| 6,842,171 B2 | 1/2005 | Richter et al. |
| 6,953,126 B2 | 10/2005 | Parker et al. |
| 6,984,680 B2 | 1/2006 | Quinn |
| 6,995,976 B2 | 2/2006 | Richardson |
| 7,017,243 B2 | 3/2006 | Carnevali |
| 7,031,148 B1 | 4/2006 | Lin |
| 7,068,783 B2 | 6/2006 | Peiker |
| 7,158,376 B2 | 1/2007 | Richardson et al. |
| 7,180,735 B2 | 2/2007 | Thomas et al. |
| 7,203,058 B2 | 4/2007 | Hong |
| 7,230,823 B2 | 6/2007 | Richardson et al. |
| 7,236,356 B2 | 6/2007 | Ulla et al. |
| 7,248,901 B2 | 7/2007 | Peiker |
| 7,257,429 B2 | 8/2007 | Kogan |
| 7,283,849 B2 | 10/2007 | Peiker |
| 7,311,526 B2 | 12/2007 | Rohrbach et al. |
| 7,312,984 B2 | 12/2007 | Richardson et al. |
| 7,320,450 B2 | 1/2008 | Carnevali |
| 7,329,128 B1 | 2/2008 | Awad |
| 7,351,066 B2 | 4/2008 | DiFonzo et al. |
| 7,430,674 B2 | 9/2008 | von Mueller et al. |
| 7,464,814 B2 | 12/2008 | Carnevali |
| 7,480,138 B2 | 1/2009 | Kogan et al. |
| 7,481,664 B1 | 1/2009 | Knoll et al. |
| 7,517,222 B2 | 4/2009 | Rohrbach et al. |
| 7,520,389 B2 | 4/2009 | Lalouette |
| 7,551,458 B2 | 6/2009 | Carnevali |
| 7,566,224 B2 | 7/2009 | Wu |
| 7,594,576 B2 | 9/2009 | Chen et al. |
| 7,609,512 B2 | 10/2009 | Richardson et al. |
| 7,612,997 B1 | 11/2009 | Diebel et al. |
| 7,625,212 B2 | 12/2009 | Du |
| 7,641,477 B2 | 1/2010 | DiFonzo et al. |
| 7,645,143 B2 | 1/2010 | Rohrbach et al. |
| 7,663,879 B2 | 2/2010 | Richardson et al. |
| 7,688,580 B2 | 3/2010 | Richardson et al. |
| 7,775,801 B2 | 8/2010 | Shiff et al. |
| 7,812,567 B2 | 10/2010 | Shen |
| 7,841,776 B2 | 11/2010 | DiFonzo et al. |
| 7,850,032 B2 | 12/2010 | Carnevali et al. |
| 7,855,529 B2 | 12/2010 | Liu |
| RE42,060 E | 1/2011 | Carnevali |
| 7,889,489 B2 | 2/2011 | Richardson et al. |
| 7,901,216 B2 | 3/2011 | Rohrbach et al. |
| 7,907,394 B2 | 3/2011 | Richardson et al. |
| 7,911,779 B1 | 3/2011 | Tarnoff |
| 7,946,891 B2 | 5/2011 | Peiker |
| 7,970,440 B2 | 6/2011 | Bury |
| RE42,581 E | 8/2011 | Carnevali |
| 7,997,554 B2 | 8/2011 | Carnevali |
| 8,061,516 B2 | 11/2011 | Carnevali |
| 8,074,951 B2 | 12/2011 | Carnevali |
| 8,080,975 B2 | 12/2011 | Bessa et al. |
| 8,087,939 B2 | 1/2012 | Rohrbach et al. |
| 8,099,138 B2 | 1/2012 | Piekarz |
| 8,167,624 B2 | 5/2012 | Hartlef et al. |
| 8,172,580 B1 | 5/2012 | Chen et al. |
| 8,177,178 B2 | 5/2012 | Carnevaali |
| 8,177,560 B2 | 5/2012 | Rohrbach et al. |
| 8,183,825 B2 | 5/2012 | Sa |
| 8,224,408 B2 | 7/2012 | Tomasini et al. |
| RE43,806 E | 11/2012 | Carnevali |
| 8,390,255 B1 | 3/2013 | Fathollahi |
| 8,405,974 B2 | 3/2013 | Sayavong |
| 8,414,312 B2 | 4/2013 | Hung et al. |
| 8,435,042 B2 | 5/2013 | Rohrbach et al. |
| 8,453,835 B2 | 6/2013 | So |
| 8,454,178 B2 | 6/2013 | Carnevali |
| 8,483,758 B2 | 7/2013 | Huang |
| 8,497,753 B2 | 7/2013 | DiFonzo et al. |
| 8,505,861 B2 | 8/2013 | Carnevali |
| 8,560,014 B1 | 10/2013 | Hu et al. |
| 8,634,887 B2 | 1/2014 | Hu et al. |
| 8,639,288 B1 | 1/2014 | Friedman |
| 8,646,698 B2 | 2/2014 | Chen et al. |
| 8,690,582 B2 | 4/2014 | Rohrbach et al. |

(56) References Cited

U.S. PATENT DOCUMENTS

| | | |
|---|---|---|
| 8,702,316 B2 | 4/2014 | DiFonzo et al. |
| 8,729,854 B2 | 5/2014 | Tsai et al. |
| 8,760,311 B2 | 6/2014 | Heaton |
| 8,763,802 B2 | 7/2014 | Ellis-Brown |
| 8,801,441 B2 | 8/2014 | Zhang et al. |
| 8,825,123 B1 | 9/2014 | Gudino |
| 8,833,716 B2 | 9/2014 | Funk et al. |
| 8,891,800 B1 | 11/2014 | Shaffer |
| 8,894,420 B2 | 11/2014 | Schichl et al. |
| 8,907,783 B2 | 12/2014 | Fish et al. |
| 8,911,246 B2 | 12/2014 | Carnevali |
| 8,929,065 B2 | 1/2015 | Williams |
| 8,950,717 B2 | 2/2015 | Chuang |
| 8,970,332 B2 | 3/2015 | DiFonzo et al. |
| 9,011,184 B2 | 4/2015 | Chen et al. |
| 9,026,187 B2 | 5/2015 | Huang |
| 9,071,060 B2 | 6/2015 | Fathollahi |
| 9,072,172 B2 | 6/2015 | Hsu |
| 9,112,304 B2 | 8/2015 | Rohrbach et al. |
| 9,123,935 B2 | 9/2015 | Huang |
| 9,147,966 B2 | 9/2015 | An |
| 9,172,781 B1 | 10/2015 | Goldstein |
| 9,195,279 B2 | 11/2015 | Carnevali et al. |
| 9,201,593 B2 | 12/2015 | Collopy et al. |
| 9,288,295 B2 | 3/2016 | Ivanovski et al. |
| 9,298,661 B2 | 3/2016 | Hamel et al. |
| 9,331,444 B2 | 5/2016 | Carnevali |
| 9,356,267 B1 | 5/2016 | To et al. |
| 9,529,387 B2 | 12/2016 | Carnevali |
| 9,535,457 B1 | 1/2017 | Vier |
| 9,591,113 B2 | 3/2017 | Filser et al. |
| 9,602,639 B2 | 3/2017 | Carnevali |
| 9,632,535 B2 | 4/2017 | Carnevali et al. |
| 9,647,474 B2 | 5/2017 | Fathollahi et al. |
| 9,706,026 B2 | 7/2017 | Carnevali |
| 9,774,713 B2 | 9/2017 | Guerdrum et al. |
| 9,776,577 B2 | 10/2017 | Carnevali |
| 9,807,211 B2 | 10/2017 | Guerdrum et al. |
| 9,809,175 B2 | 11/2017 | Jonik et al. |
| 9,817,441 B1 | 11/2017 | Kuo |
| 9,831,904 B1 | 11/2017 | Carnevali |
| 9,898,041 B2 | 2/2018 | Blowers et al. |
| 9,924,005 B1 | 3/2018 | McElderry |
| 10,050,658 B2 | 8/2018 | Carnevali |
| 10,054,984 B2 | 8/2018 | Carnevali et al. |
| 10,148,104 B2 | 12/2018 | Sa |
| 10,172,246 B2 | 1/2019 | Apter |
| 10,330,251 B2 | 6/2019 | Carnevali |
| 10,389,399 B2 | 8/2019 | Carnevali |
| 10,401,905 B2 | 9/2019 | Carnevali |
| 10,416,715 B1 | 9/2019 | Wade et al. |
| 10,454,515 B2 | 10/2019 | Carnevali |
| 10,485,312 B2 | 11/2019 | Rodriguez |
| 10,630,334 B2 | 4/2020 | Carnevali |
| 10,656,687 B2 | 5/2020 | Tashiro et al. |
| 10,666,309 B2 | 5/2020 | Carnevali |
| 10,707,632 B1 | 7/2020 | Yamamoto et al. |
| 10,714,953 B1 | 7/2020 | Solana et al. |
| 10,778,275 B2 | 9/2020 | Carnevali |
| 10,788,857 B2 | 9/2020 | Huang et al. |
| 10,812,643 B1 | 10/2020 | Carnevali et al. |
| 10,928,856 B1 | 2/2021 | Hamlin et al. |
| 10,976,777 B2 | 4/2021 | Pischel |
| 11,029,731 B1 * | 6/2021 | Carnevali ............ H04B 1/3888 |
| 11,076,032 B1 * | 7/2021 | Carnevali ............ F16M 11/041 |
| 11,165,458 B2 | 11/2021 | Carnevali |
| 11,277,506 B2 | 3/2022 | Carnevali |
| 11,289,864 B2 | 3/2022 | Carnevali et al. |
| 11,412,079 B1 * | 8/2022 | James ................. H04B 1/3888 |
| 11,489,350 B2 | 11/2022 | Carnevali |
| 11,522,379 B2 | 12/2022 | Lee et al. |
| 11,597,334 B2 | 3/2023 | Telesco et al. |
| 11,619,971 B1 | 4/2023 | Passe et al. |
| 2002/0009194 A1 | 1/2002 | Wong et al. |
| 2002/0032041 A1 | 3/2002 | Hirai et al. |
| 2002/0191782 A1 | 12/2002 | Beger et al. |
| 2003/0068986 A1 | 4/2003 | Oh |
| 2003/0116631 A1 | 6/2003 | Salvato et al. |
| 2004/0108348 A1 | 6/2004 | Barnes |
| 2004/0209489 A1 | 10/2004 | Clapper |
| 2004/0232291 A1 * | 11/2004 | Carnevali ............ F16M 13/00 248/206.5 |
| 2005/0189354 A1 | 9/2005 | Heather et al. |
| 2006/0058073 A1 | 3/2006 | Kim |
| 2006/0175766 A1 | 8/2006 | Carnevali |
| 2007/0127204 A1 | 6/2007 | Muenzer et al. |
| 2008/0002355 A1 * | 1/2008 | Carnevali ............. G06F 1/16 361/679.41 |
| 2008/0104301 A1 | 5/2008 | Assouad et al. |
| 2008/0149796 A1 | 6/2008 | Moscovitch |
| 2008/0273734 A1 | 11/2008 | Solland |
| 2009/0021903 A1 | 1/2009 | Chen et al. |
| 2009/0140113 A1 | 6/2009 | Carnevali |
| 2009/0160400 A1 | 6/2009 | Woud |
| 2009/0314400 A1 | 12/2009 | Liu |
| 2011/0143583 A1 * | 6/2011 | Zilmer ................. H04M 1/04 439/529 |
| 2012/0018325 A1 | 1/2012 | Kim |
| 2012/0043235 A1 | 2/2012 | Klement |
| 2012/0088558 A1 | 4/2012 | Song |
| 2012/0118773 A1 | 5/2012 | Rayner |
| 2012/0211382 A1 | 8/2012 | Rayner |
| 2012/0250270 A1 | 10/2012 | Liu |
| 2012/0261306 A1 | 10/2012 | Richardson et al. |
| 2012/0298536 A1 | 11/2012 | Rauta et al. |
| 2013/0092576 A1 | 4/2013 | Rayner |
| 2013/0106353 A1 | 5/2013 | Foster |
| 2013/0193006 A1 | 8/2013 | Bergreen et al. |
| 2013/0193174 A1 * | 8/2013 | Ackeret ................ F16M 13/00 224/275 |
| 2013/0220841 A1 | 8/2013 | Yang |
| 2013/0258573 A1 | 10/2013 | Muday et al. |
| 2013/0273752 A1 | 10/2013 | Rudisill et al. |
| 2013/0273983 A1 | 10/2013 | Hsu |
| 2013/0322568 A1 | 12/2013 | Pais et al. |
| 2013/0331156 A1 | 12/2013 | Lui |
| 2013/0334071 A1 | 12/2013 | Carnevali |
| 2014/0042285 A1 | 2/2014 | Carnevali |
| 2014/0055928 A1 | 2/2014 | Lee |
| 2014/0070774 A1 | 3/2014 | Terlizzi et al. |
| 2014/0099526 A1 | 4/2014 | Powell et al. |
| 2014/0168885 A1 | 6/2014 | Williams |
| 2014/0347000 A1 | 11/2014 | Hamann et al. |
| 2014/0363988 A1 | 12/2014 | An |
| 2015/0055289 A1 | 2/2015 | Chang et al. |
| 2015/0146401 A1 | 5/2015 | Su et al. |
| 2015/0188356 A1 * | 7/2015 | Chen ................... H02J 7/0044 320/108 |
| 2015/0189780 A1 | 7/2015 | Su et al. |
| 2016/0031382 A1 * | 2/2016 | Chinn ................... A61B 90/50 29/428 |
| 2016/0065702 A1 | 3/2016 | Carnevali |
| 2016/0231779 A1 | 8/2016 | Kaneko et al. |
| 2016/0288151 A1 * | 10/2016 | Schultz ................ A47K 5/1207 |
| 2017/0054312 A1 | 2/2017 | Kuchynka et al. |
| 2017/0187211 A1 * | 6/2017 | Fan ........................ H04B 1/385 |
| 2017/0227987 A1 | 8/2017 | Carnevali et al. |
| 2018/0279809 A1 | 10/2018 | Regan et al. |
| 2018/0314296 A1 | 11/2018 | Evns, V et al. |
| 2019/0267825 A1 | 8/2019 | Chien |
| 2020/0330037 A1 | 10/2020 | Al-Ali et al. |
| 2020/0371555 A1 | 11/2020 | Huang et al. |
| 2021/0048848 A1 | 2/2021 | Pischel |
| 2021/0194256 A1 * | 6/2021 | Carnevali ............... H04M 1/04 |
| 2021/0218256 A1 * | 7/2021 | Yang ....................... H01F 38/14 |
| 2021/0344226 A1 * | 11/2021 | Smith ..................... H02J 50/10 |
| 2021/0363788 A1 * | 11/2021 | Gulick, Jr. ........... E05B 73/0082 |
| 2021/0377378 A1 * | 12/2021 | Carnevali ............... H04M 1/06 |
| 2021/0391678 A1 | 12/2021 | Carnevali |
| 2021/0392773 A1 | 12/2021 | Carnevali |
| 2022/0026951 A1 | 1/2022 | Wood, III et al. |
| 2022/0066505 A1 | 3/2022 | Lu et al. |

(56) References Cited

U.S. PATENT DOCUMENTS

| | | | |
|---|---|---|---|
| 2023/0039167 A1 | 2/2023 | Kamepalli et al. | |
| 2024/0072555 A1* | 2/2024 | Allen | H02J 7/0044 |
| 2024/0085952 A1* | 3/2024 | Barnett | G06F 1/1632 |

FOREIGN PATENT DOCUMENTS

| | | |
|---|---|---|
| CN | 1312603 | 11/2012 |
| CN | 202565335 | 11/2012 |
| CN | 204334055 | 5/2015 |
| CN | 204334674 | 5/2015 |
| CN | 204408423 | 6/2015 |
| JP | 2004-349969 | 12/2004 |
| JP | 2014-75327 | 4/2014 |
| KR | 20-0265673 | 2/2002 |
| KR | 10-1078214 | 11/2011 |
| TW | 2003TW531119 | 5/2003 |
| TW | M422808 | 2/2012 |
| WO | 2012/052751 | 4/2012 |
| WO | 2013/081222 | 6/2013 |
| WO | 2014/054426 | 4/2014 |
| WO | 2015/022675 | 2/2015 |

OTHER PUBLICATIONS

Otterbox Product directory, 20 pages of product description of Otter Box waterproof boxes retrieved from web site at: www.otterbox.com Dated Sep. 2, 2005. Otter Products, LLC, Bldg. 1 Old-Town Square, Suite 303, Fort Collins, CO 80524 Phone: 1-888-695-8820, 970-493-8446; Facsimile: 1-888-695-8827, 970-493-1755.

Officeonthego.com, 3 pages of product description of Magnifico® Plus screen magnifier product information retrieved from web site at: www.officeonthego.com.

2 pages of product information for Armor 1600 and Armor 1601 waterproof, dustproof and airtight protective cases.

2 pages Otterrox 4600 Tablet PC Case protective cases product information retrieved from web site at: www.otterbox.com.

Jason Poel Smith: "How to Transplant RFID Chips", Sep. 3, 2013 (Sep. 3, 2013), XP55492991, Retrieved from the Internet: URL: http://www.instructables.com/id/How-to-Transplant-RFID-Chips/ [retrieved on Jul. 17, 2018].

\* cited by examiner

CRADLES FOR A MOBILE DEVICE INCLUDING A CAVITY FOR A WIRELESS DEVICE AND METHODS OF MAKING AND USING

FIELD

The present invention is directed to cradles for a mobile device. The present invention is also directed to a cradle for a mobile device including a cavity for a wireless charging device or other wireless device and methods of making and using.

BACKGROUND

Mobile devices, such as smartphones, cellular or mobile phones, tablets, personal data assistants, and other portable devices, are now ubiquitous. Cradles can be used to protect the mobile device and to mount the mobile device onto a surface or object.

BRIEF SUMMARY

One embodiment is a cradle for a mobile device. The cradle includes a cradle base including a removable cover, a cavity base, and sidewalls extending from the cavity base to the removable cover, wherein the removable cover is configured for resting a back surface of a mobile device received in the cradle, where the removable cover, the cavity base, and the sidewalls define a cavity configured for receiving a wireless device configured for wirelessly interacting with the mobile device received in the cradle. The cradle also includes a top device receiver coupled to the cradle base and configured to receive and retain a top portion of the mobile device received in the cradle and a bottom device receiver coupled to the cradle base and configured to receive and retain a bottom portion of the mobile device received in the cradle.

In at least some embodiments, the cradle further includes a device platform disposed within the cavity and configured for receive the wireless device. In at least some embodiments, the device platform includes one or more retention walls configured to retain the wireless device on the device platform. In at least some embodiments, the device platform is slidable within the cavity. In at least some embodiments, the device platform includes at least one pin extending from the device platform, each of the at least one pin including a foot at a distal end of the pin, wherein the cradle base includes at least one track with an elongated opening and a surface, wherein each of the at least one pin extends through a one of the at least one track and engages the surface with the foot. In at least some embodiments, the cradle further includes at least one fastener configured to be inserted in the at least one foot to tighten the at least one foot against the surface of the at least one track when the device platform is disposed in a desired position within the cavity. In at least some embodiments, the surface of the at least one track includes teeth formed thereon.

In at least some embodiments, the cradle further includes a slide arm coupled to the top device receiver for sliding the top device receiver away from, or toward, the cradle base. In at least some embodiments, the slide arm biases the top device receiver toward the cradle base. In at least some embodiments, the cradle base further includes a slide arm housing into which the slide arm extends. In at least some embodiments, the cradle further includes a spring disposed within the slide arm housing and arranged relative to the slide arm to bias the top device receiver toward the cradle base.

In at least some embodiments, the sidewalls of the cradle base define an opening for passage of a cord of the wireless device out of the cavity. In at least some embodiments, the top device receiver is a top cup. In at least some embodiments, the bottom device receiver is a bottom cup.

In at least some embodiments, the cradle base further includes at least one cover support to further define the cavity and to support the removable cover when the removable cover is disposed on a remainder of the cradle base. In at least some embodiments, the cradle base further includes at least one non-removable plate disposed adjacent the removable cover when the removable cover is disposed on a remainder of the cradle base. In at least some embodiments, the cradle base further includes at least one mounting hole configured for attachment of a mount to the cradle base.

Another embodiment is a system that includes any of the cradles described above and the wireless device or the mobile device or both. In at least some embodiments, the wireless device is a wireless charging device. In at least some embodiments, the wireless device is a wireless communication device.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1A:
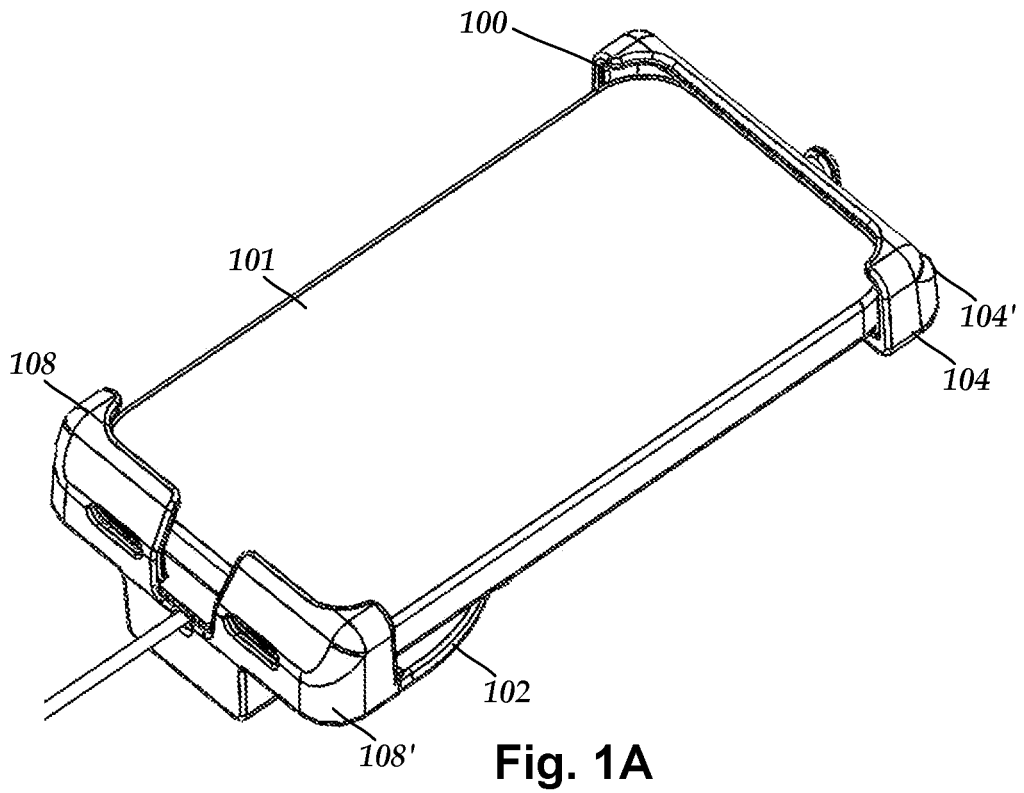
FIG. 1A is a schematic perspective top view of one embodiment of a cradle for a mobile device with the mobile device loaded in the cradle, according to the invention.

The present invention is directed to cradles for a mobile device. The present invention is also directed to a cradle for a mobile device including a cavity for a wireless charging device or other wireless device and methods of making and using.

FIGS. 1A to 1H illustrate one embodiment of a cradle 100 for a mobile device 101, such as a cellular or mobile phone, a smartphone, a tablet, a personal data assistant, or any other suitable mobile device. The cradle 100 includes a cradle base 102, a top device receiver 104, such as a top cup 104', for receiving a top portion of the mobile device, a slide arm 106 (FIG. 1B) coupled to the top device receiver and extending into the cradle base, and a bottom device receiver 108, such as bottom cup 108', coupled to the cradle base 102 for receiving a bottom portion of the mobile device. The top device receiver 104 and bottom device receiver 108 are illustrated as cups, but it will be understood that any other suitable arrangement for receiving and retaining a top portion or bottom portion, respectively, of the mobile device can be used including, but not limited to, clips, retention arms, or the like or any combination thereof.

Figure 1B:
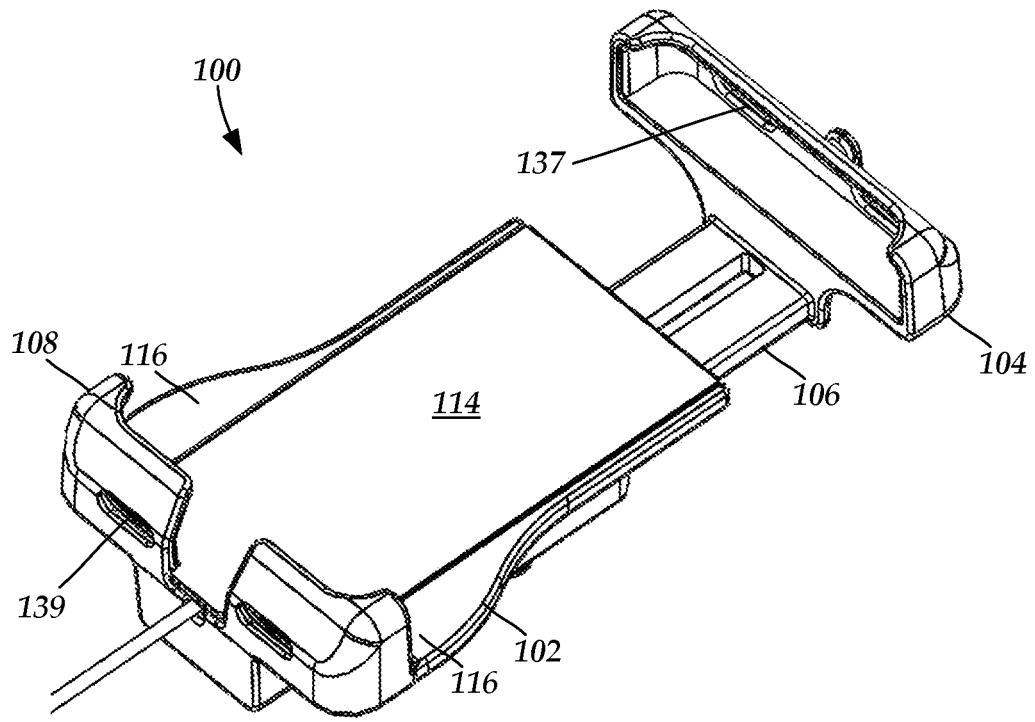
FIG. 1B is a schematic perspective top view of the cradle of FIG. 1A with a top device receiver (e.g., a top cup) of the cradle extended from a cradle base, according to the invention.
Figure 1C:
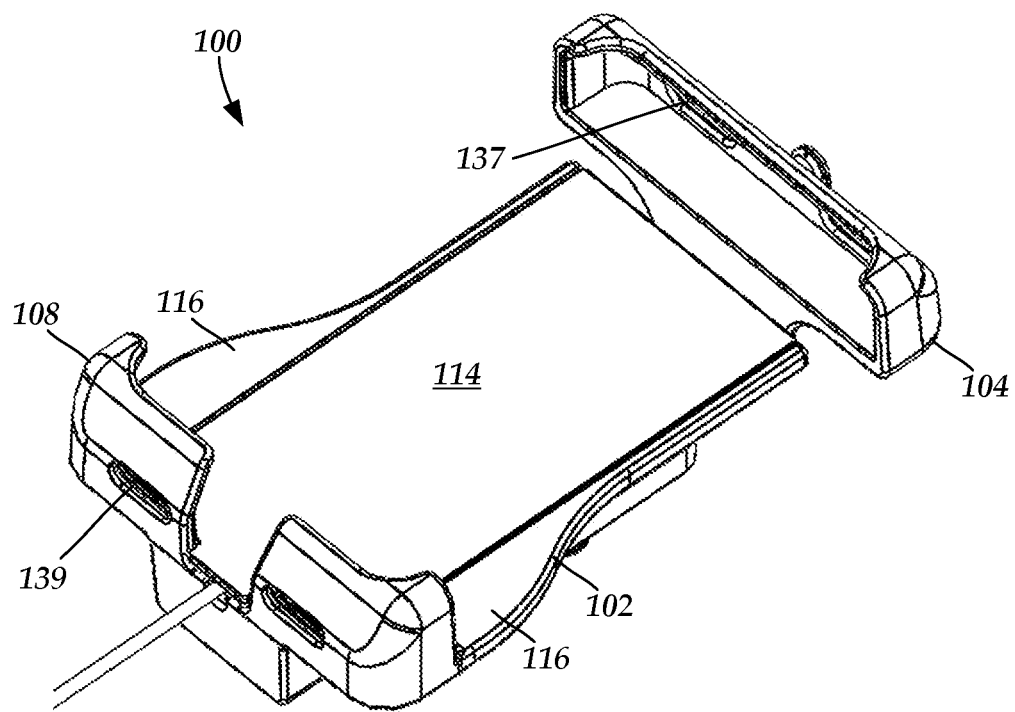
FIG. 1C is a schematic perspective top view of the cradle of FIG. 1A with the top device receiver slid toward the cradle base, according to the invention.

The top device receiver 104 and slide arm 106 are slidingly coupled to the cradle base 102 to permit use of the cradle with mobile devices of different lengths. The cradle base 102 includes a removable cover 114 and optionally one or more non-removable plates 116, as illustrated in FIG. 1B, that form a platform upon which the back of the mobile device 101 rests when received in the cradle 100. In at least some embodiments, the removable cover 114 is a plate. In at least some embodiments, the removable cover 114 can be removed by sliding the removable cover way from the bottom cup 108 to release the removable cover 114 from the remainder of the cradle base 102. In at least some embodiments, the removable cover 114 can include one or more pins or extensions that engage openings or holes in the cradle base 102. The removable cover 114 can be removed by lifting the removable cover away from the cradle base 102.

Figure 1D:
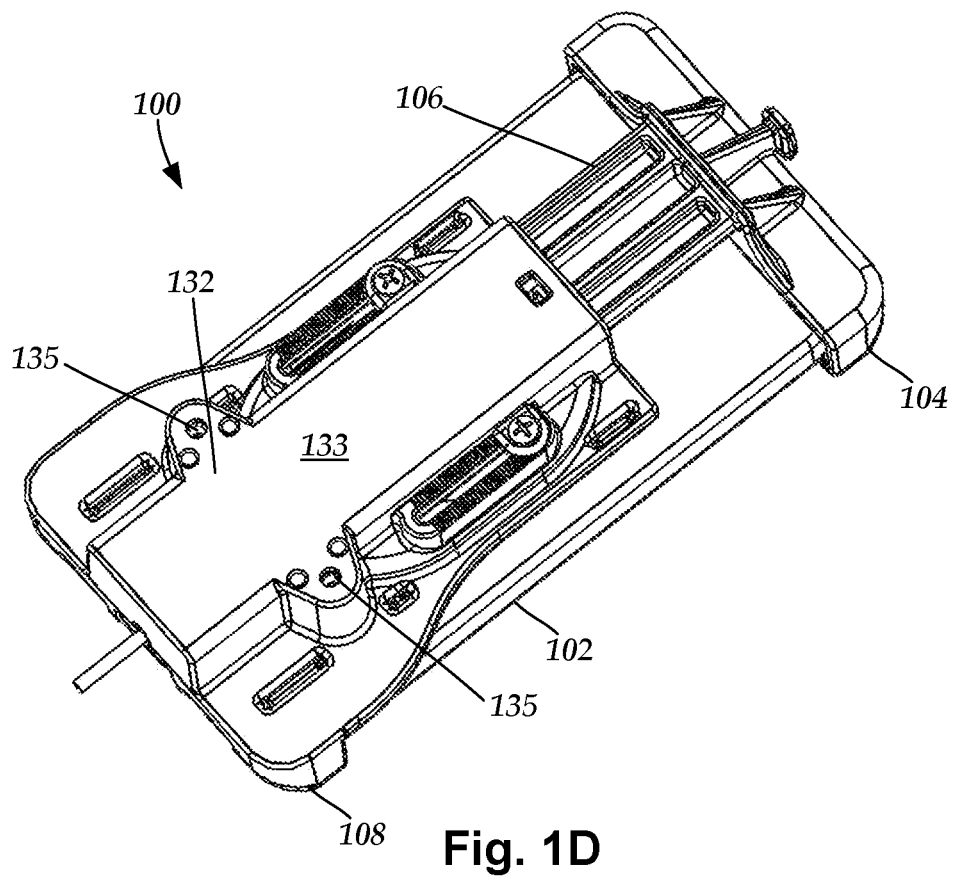
FIG. 1D is a schematic perspective bottom view of the cradle of FIG. 1A, according to the invention.
Figure 1E:
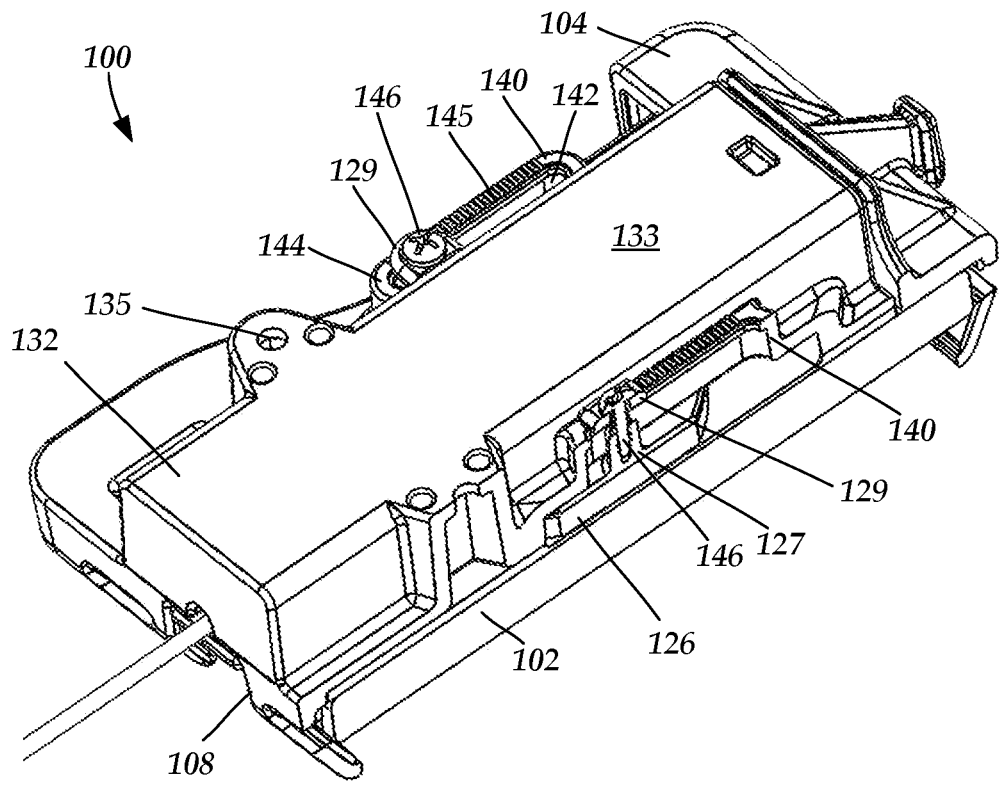
FIG. 1E is a schematic perspective bottom cross-sectional view of the cradle of FIG. 1A, according to the invention.
Figure 1F:
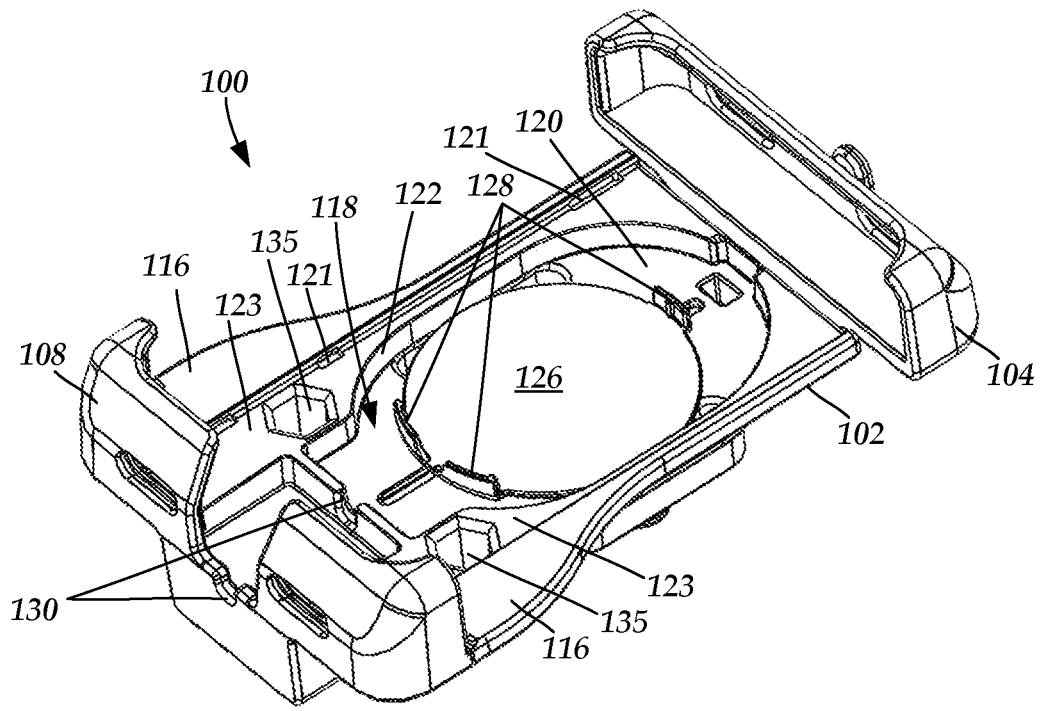
FIG. 1F is a schematic perspective top view of the cradle of FIG. 1A with a removable cover removed to view a cavity and device platform within the cavity, according to the invention.

As illustrated in FIG. 1F, below the removable cover 114 is a cavity 118 defined by a cavity base 120, one or more cover supports 123 (that are recessed relative to the non-removable plate(s) 116, if present), and cavity sidewalls 122 extending from the cavity base to the cover support(s) or removable cover 114 (when attached). In at least some embodiments, the cavity sidewalls 122 or cover supports include openings (or holes) 121 for receiving pins or extensions from the removable cover 114 to hold the removable cover 114 in place.

Figure 1G:
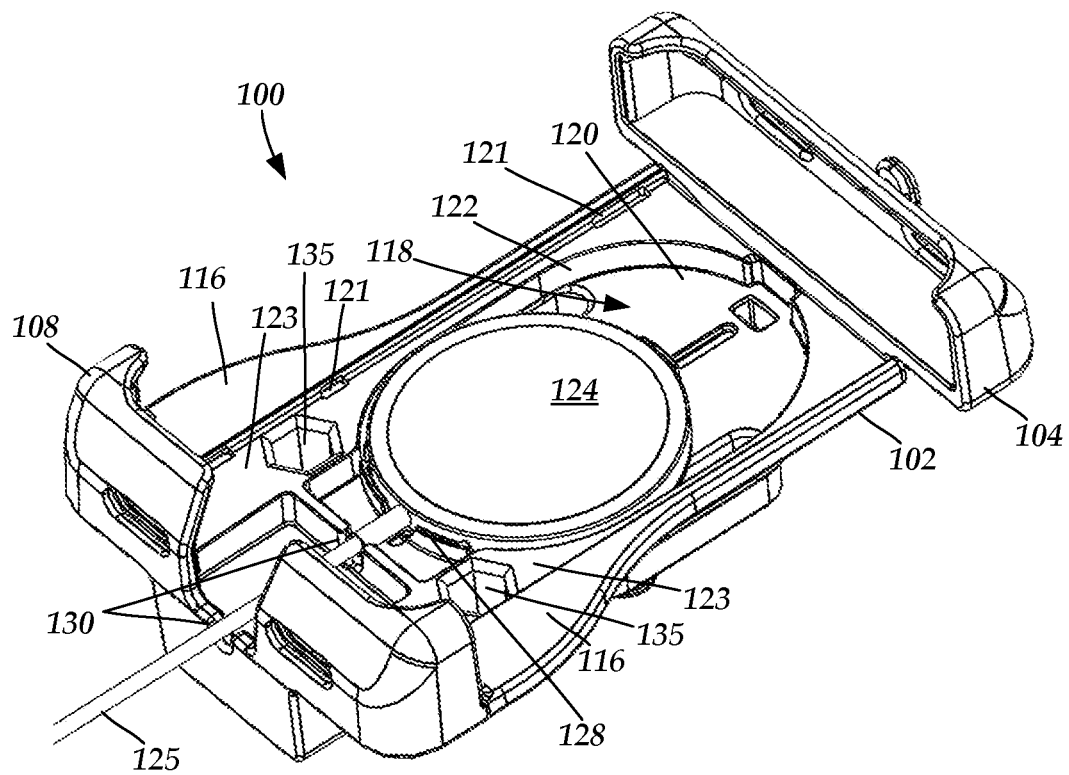
FIG. 1G is a schematic perspective top view of the cradle of FIG. 1A with the removable cover removed and a wireless device disposed in the device platform within the cavity, according to the invention.

The cavity 118 is configured to retain a wireless device 124, such as a wireless charging device or charging puck or other wireless device, as illustrated in FIG. 1G. The wireless device 124 is capable of charging, communicating, or otherwise interacting with the mobile device 101 wirelessly. In at least some embodiments, the wireless device 124 is connected to a power or data source by a cord 125. In at least some embodiments, the cavity sidewalls 122 and bottom cup 108 include at least one opening 130 for passage of the cord 125 of the wireless device 124 out of the cavity 118 and out of the cradle 100, as illustrated in FIG. 1G.

In at least some embodiments, the removable cover 114 does not include any port or opening for wired coupling of the wireless device 124 to the mobile device 101. In at least some embodiments, the cradle 100 does not include any contacts, wires, traces, or the like for non-wirelessly coupling of the wireless device 124 to the mobile device 101.

In at least some embodiments, the cradle base 102 includes a device platform 126 with one or more retention walls 128, as illustrated in FIG. 1F. The device platform 126 is arranged to receive and hold the wireless device 124, as illustrated in FIG. 1G. In at least some embodiments, the device platform 126 includes at least two retention walls 128 positioned at opposite ends of the device platform. In at least some embodiments, one or more (or all) of the retention wall(s) 128 are flexible to facilitate loading or unloading the wireless device 124 on the device platform 126.

Figure 1H:
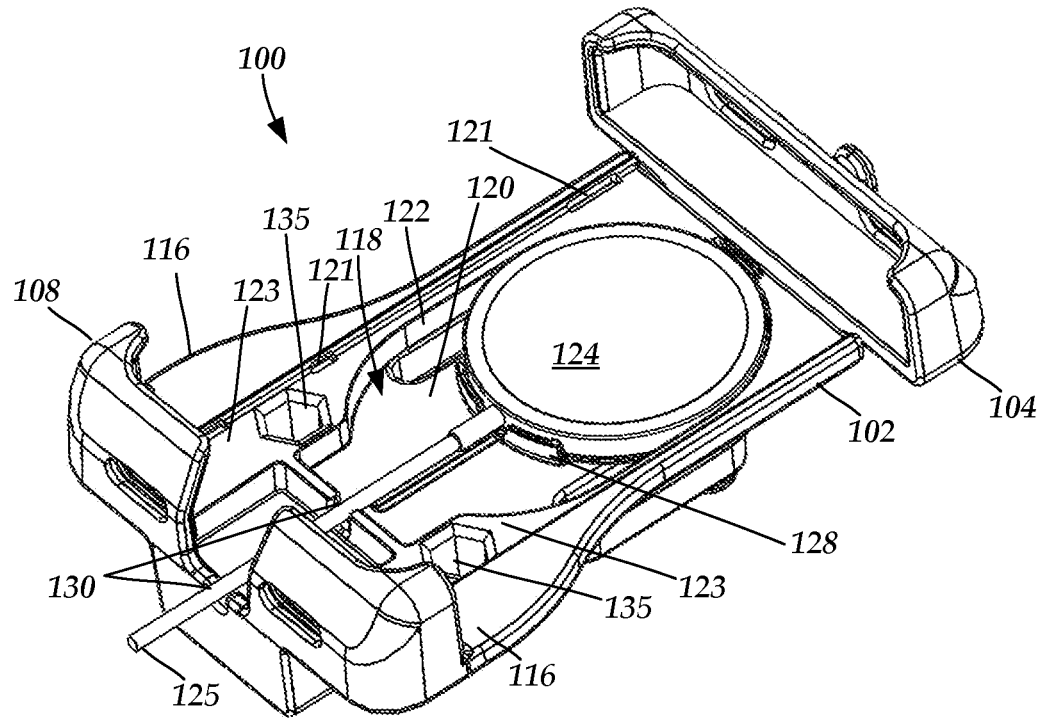
FIG. 1H is a schematic perspective top view of the cradle of FIG. 1A with the removable cover removed and the wireless device disposed in the device platform within the cavity and disposed closer to the top device receiver, according to the invention.

In at least some embodiments, the device platform 126 is slidable within the cavity 118 as illustrated in FIGS. 1G and 1H. Sliding of the device platform 126 may facilitate orienting the wireless device 124 with the mobile device 101 to enhance or improve charging, communication, or other interaction. In at least some embodiments, at least one pin 127 (for example, two pins) extends from the device platform 126 and each terminates in a foot 129, as illustrated in FIG. 1E. The cradle base 102 includes at least one track 140 (for example, two tracks) with each including an elongated aperture 142 through which a pin 127 extends with the foot 129 of the pin engaging a surface 144 of the track. The pin(s) 127 can be moved along the elongated aperture(s) 142 to adjust the position of the device platform 126 within the cavity 118. In at least some embodiments, the cradle 100 also includes at least one fastener 146 that can be inserted into the foot 129 of each pin 127 to tighten the foot against the surface 144 of a corresponding track 140 when the desired position of the device platform 126 is determined in order to maintain the device platform in the desired position. In at least some embodiments, the surface 144 of the track 140 may include teeth 145 (and, optionally, corresponding teeth (not shown) disposed on the foot 129) to facilitate maintenance of the device platform 126 in the determined position.

The slide arm 106 extends away from the top device receiver 104 and into a slide arm housing 132 on a back side of the cradle base 102, as illustrated in FIG. 1D. In at least some embodiments, the slide arm housing 132 is disposed beneath at least a portion of the cavity base 120. In at least some embodiments, the slide arm housing 132 is disposed beneath a portion of the cover supports 123. In at least some embodiments, the slide arm housing 132 is disposed beneath a portion of the non-removable plates 116.

Figure 2A:
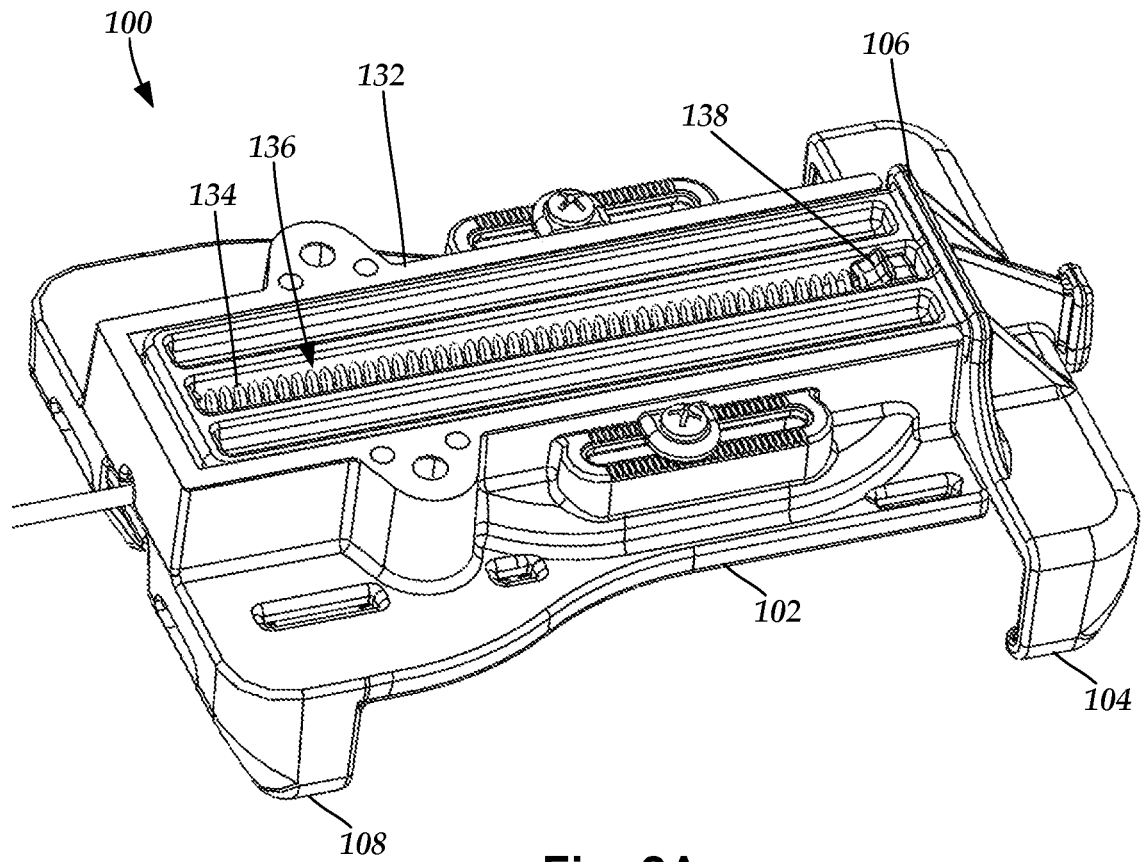
FIG. 2A is a schematic perspective bottom view of the cradle of FIG. 1A with a back panel of a slide arm housing removed to view components within the slide arm housing, according to the invention.
Figure 2B:
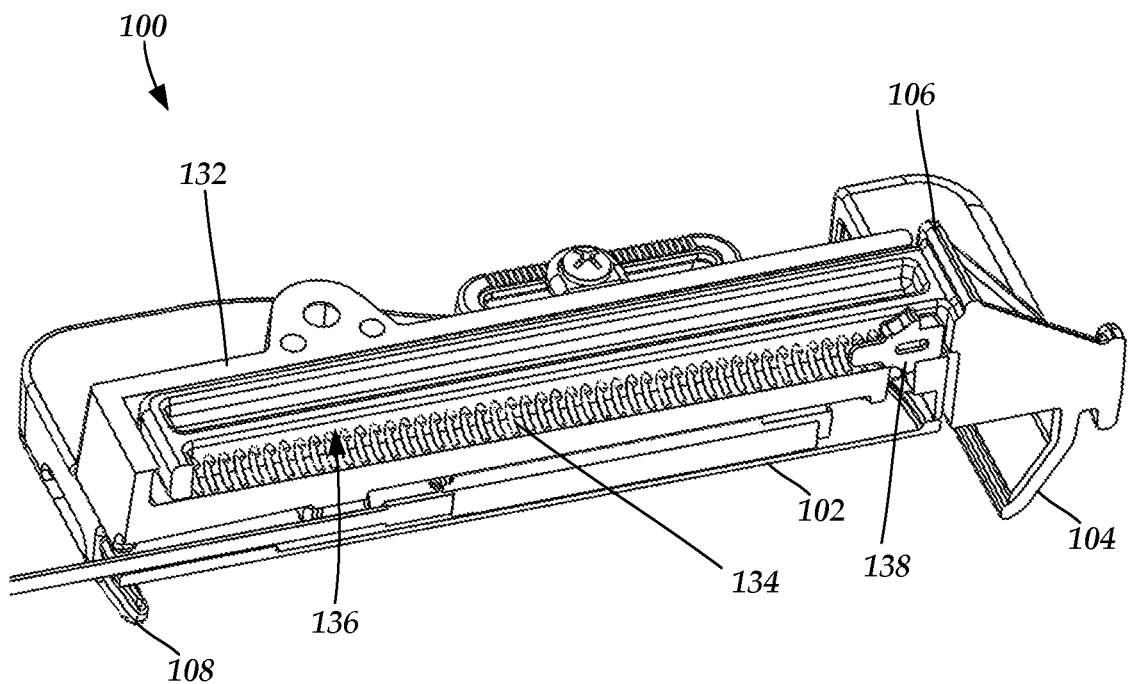
FIG. 2B is a cross-sectional view of the cradle of FIG. 2A, according to the invention.

In at least some embodiments, the top device receiver 104 is biased toward the cradle base 102 to hold the mobile device in the cradle 100. In FIG. 2A, a back plate 133 (FIG. 1D) of the slide arm housing 132 has been removed for illustration of the interior of the slide arm housing. A cross-sectional view is presented in FIG. 2B. The back plate 133 may be removable from a remainder of the slide arm housing 132 or may be an integral (e.g., unremovable) portion of the slide arm housing.

In at least some embodiments, a spring 134 or other biasing element is positioned in the slide arm housing 132 in a cavity 136 formed by the slide arm 106. In at least some embodiments, slide arm housing 132 includes a stop 138 to prevent or resist removal of the slide arm 106 entirely from the slide arm housing 132. As the top device receiver 104 is pulled away from the cradle base 102, the spring 134 is compressed. This allows a mobile device 101 to be loaded into the cradle 100. When the force pulling the top device receiver 104 away from the cradle base 102 is removed or relaxed, the spring 134 biases the top device receiver toward the cradle base to hold and retain the mobile device 101 in the cradle 100.

In at least some embodiments, the top device receiver 104 may include one or more openings 137 (FIG. 1B) for access to a speaker, microphone, button, or other element on the mobile device 101. The bottom cup 108 may include one or more openings 139 (FIG. 1B) for access to a speaker, microphone, button, or other element on the mobile device 101 or for access to a connector port on the mobile device.

In at least some embodiments, an optional mount (not shown) is coupled or coupleable to the cradle 100 using at least one mounting hole 135 (FIGS. 1D and 1F) on the slide arm housing 132 which receive a fastener (such as a screw or a nut/bolt) to couple mount to the cradle 100. In at least some embodiments, the mounting hole(s) 135 may be accessible with the removable cover 114 is removed, as illustrated in FIG. 1F. Non-limiting examples of mounts can be found at U.S. Pat. Nos. 5,845,885; 6,561,476; 7,997,554; 8,454,178; 8,505,861; 9,831,904; RE42,060; RE42,581; and RE43,806, all of which are incorporated herein by reference.

The above specification provides a description of the invention and the manufacture and use of the invention. Since many embodiments of the invention can be made without departing from the spirit and scope of the invention, the invention also resides in the claims hereinafter appended.

What is claimed as new and desired to be protected is:

1. A cradle for a mobile device, the cradle comprising:
    a cradle base comprising a removable cover, a cavity base, and sidewalls extending from the cavity base to the removable cover, wherein the removable cover is configured for resting against a back surface of a mobile device received in the cradle, wherein the removable cover, the cavity base, and the sidewalls define a cavity configured for receiving a wireless device configured for wirelessly interacting with the mobile device received in the cradle;
    a device platform disposed within the cavity and configured to receive the wireless device, wherein the device platform comprises one or more retention walls configured to retain the wireless device on the device platform;
    a top device receiver coupled to the cradle base and configured to receive and retain a top portion of the mobile device received in the cradle; and
    a bottom device receiver coupled to the cradle base and configured to receive and retain a bottom portion of the mobile device received in the cradle.

2. The cradle of claim 1, wherein the device platform comprises a plurality of the retention walls configured to retain the wireless device on the device platform.

3. The cradle of claim 1, wherein the device platform is slidable within the cavity.

4. The cradle of claim 1, wherein the sidewalls of the cradle base define an opening for passage of a cord of the wireless device out of the cavity.

5. The cradle of claim 3, wherein the device platform comprises at least one pin extending from the device platform, each of the at least one pin comprising a foot at a distal end of the pin, wherein the cradle base comprises at least one track with an elongated opening and a surface, wherein each of the at least one pin extends through a one of the at least one track and engages the surface with the foot.

6. The cradle of claim 5, further comprising at least one fastener configured to be inserted in the at least one foot to tighten the at least one foot against the surface of the at least one track when the device platform is disposed in a desired position within the cavity.

7. The cradle of claim 5, wherein the surface of the at least one track comprises teeth formed thereon.

8. The cradle of claim 5, wherein the device platform comprises two pins and the cradle base comprises two opposing tracks.

9. The cradle of claim 1, further comprising a slide arm coupled to the top device receiver for sliding the top device receiver away from, or toward, the cradle base.

10. The cradle of claim 9, wherein the slide arm biases the top device receiver toward the cradle base.

11. The cradle of claim 9, wherein the cradle base further comprises a slide arm housing into which the slide arm extends.

12. The cradle of claim 11, further comprising a spring disposed within the slide arm housing and arranged relative to the slide arm to bias the top device receiver toward the cradle base.

13. The cradle of claim 1, wherein the top device receiver is a top cup.

14. The cradle of claim 1, wherein the bottom device receiver is a bottom cup.

15. The cradle of claim 1, wherein the cradle base further comprises at least one cover support to further define the cavity and to support the removable cover when the removable cover is disposed on a remainder of the cradle base.

16. The cradle of claim 1, wherein the cradle base further comprises at least one non-removable plate disposed adjacent the removable cover when the removable cover is disposed on a remainder of the cradle base.

17. The cradle of claim 1, wherein the cradle base further comprises at least one mounting hole configured for attachment of a mount to the cradle base.

18. A system, comprising:
    the cradle of claim 1; and
    the wireless device.

19. The system of claim 18, wherein the wireless device is a wireless charging device.

20. The system of claim 18, further comprising the mobile device.

* * * * *